Patented Nov. 12, 1940

2,221,028

UNITED STATES PATENT OFFICE 2,221,028

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application July 1, 1939,
Serial No. 282,528

13 Claims. (Cl. 260—152)

This invention relates to the art of dyeing or coloring. More particularly, it relates to azo dye compounds and the application of the nuclear non-sulfonated azo dye compounds for the coloration of organic derivatives of cellulose, particularly textile materials made of or containing an organic derivative of cellulose by dyeing, printing, stenciling, or like methods.

Organic derivatives of cellulose are characterized by an indifferent affinity for the usual cotton and wool dyes, especially the ordinary water soluble dyes. Because of this, it has been necessary to develop new dye compounds suitable for the dyeing or coloration of materials such as textile materials made of or containing an organic derivative of cellulose. It is, accordingly, an object of our invention to provide a new class of azo dyes suitable for the dyeing or coloration of organic derivatives of cellulose.

Another object of our invention is to provide a process for the dyeing or coloration of organic derivatives of cellulose. A further object is to provide a process for the coloration of organic derivatives of cellulose in which the dye or dyes are applied directly to the material undergoing coloration from an aqueous suspension. A still further object is to produce dyeings on organic derivatives of cellulose which are of good fastness to light and washing.

Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The azo dye compounds of our invention consist of the azo compounds represented by the general formulae:

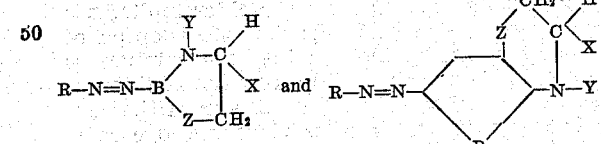

wherein R represents the residue of an aromatic nucleus, Z represents a member selected from the group consisting of a sulfur atom, a —S=O group and a

group, B represents the residue of an aryl nucleus of the benzene series containing but one benzene nucleus and wherein the nitrogen atom shown and Z are attached to said aryl nucleus B in para and meta position, respectively, to the azo bond, $B_1$ represents the residue of an aryl nucleus of the benzene series containing but one benzene nucleus joined to the nucleus shown through adjacent carbon atoms, and X and Y each represents a member selected from the group consisting of hydrogen, an alkyl group, an allyl group, an aryl group and a cycloalkyl group.

It will be understood that alkyl, as used herein, unless otherwise indicated, includes not only unsubstituted alkyl groups such as a methyl group, an ethyl group, a propyl group or a butyl group but also substituted alkyl groups such as β-hydroxyethyl, β-hydroxypropyl, β,γ-hydroxypropyl, β-methoxyethyl or β-ethoxyethyl, for example. Illustrative of cycloalkyl may be mentioned cyclobutyl and cyclohexyl.

The azo dye compounds of our invention can be prepared by diazotizing a primary aromatic amine and coupling the diazonium compound obtained with a coupling component selected from the group consisting of coupling components represented by the general formulae:

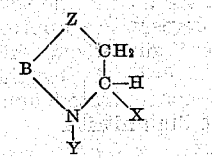

and

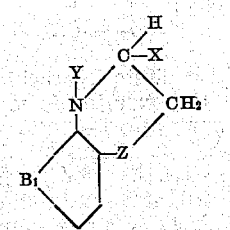

wherein Z represents a sulfur atom, a —S=O group and a

group, B represents the residue of an aryl nucleus of the benzene series and wherein Z and the nitrogen atom shown attached to B are joined to adjacent carbon atoms of said aryl nucleus B, $B_1$ represents the residue of an aryl nucleus of the benzene series joined to the nucleus shown through adjacent carbon atoms, and X and Y each represents a member selected from the group consisting of hydrogen, an alkyl group, an allyl group, an aryl group and a cycloalkyl group. The aryl nuclei B and $B_1$ can contain various substituents as clearly shown hereinafter. Illustrative of such substituents can be mentioned an alkyl group, an alkoxy group such as methoxy, ethoxy, propoxy, β-methoxyethoxy or β-ethoxyethoxy, a halogen atom such as bromine, chlorine or iodine, an amino group and a hydroxy group.

The azo dye compounds of our invention constitute valuable dyes which are suitable in part for the dyeing or coloring of organic derivatives of cellulose and in part for the dyeing or coloring of cotton, wool and silk. The nuclear non-sulfonated azo dye compounds are of particular value in connection with the dyeing or coloring of organic derivatives of cellulose although they possess some application for the coloration of cotton, wool and silk. The nuclear sulfonated dye compounds possess little or no practical utility for the coloration of organic derivatives of cellulose but are of utility for the dyeing of cotton, wool and silk. These latter compounds may be prepared by sulfonation of the unsulfonated azo dye compounds or by prior sulfonation of the intermediates employed in their preparation. Generally speaking, when the azo dye compounds of our invention are to be used for the coloration of organic derivatives of cellulose, it is advantageous that they do not contain a nuclear free carboxylic acid group. Dyeings of good fastness to light and washing of various shades can be obtained when employing the dye compounds of our invention. For the dyeing of organic derivatives of cellulose, compounds wherein B is an aryl nucleus of the benzene series are generally advantageous.

The following examples illustrate the preparation of the azo dye compounds of our invention.

*Example 1*

13.8 grams of p-nitroaniline are added to 200 cc. of water to which has been added 40 cc. of 36% hydrochloric acid. The resulting solution is cooled to a temperature approximating 0–5° C. and the amine is diazotized while maintaining a temperature of 0–20° C. by the addition, with stirring, of a concentrated aqueous solution of 6.9 grams of sodium nitrite.

23.5 grams of

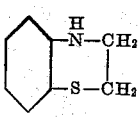

are dissolved in a dilute hydrochloric acid solution. The resulting solution is cooled to a temperature approximating 0–10° C. and the diazo solution prepared as described above is added with stirring. After addition of the diazo solution, the mixture is allowed to stand for a short time after which it is made neutral to Congo red paper by the addition of sodium acetate. Upon completion of the coupling reaction which takes place, the dye compound formed is recovered by filtration, washed with water and dried. The dye compound obtained colors cellulose acetate silk a red shade.

By the substitution of 17.9 grams of

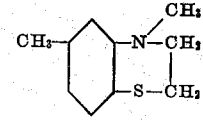

25.3 grams of

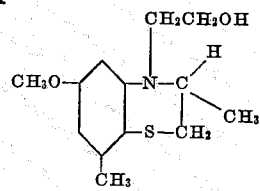

26.8 grams of

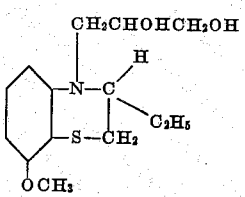

and 26.9 grams of

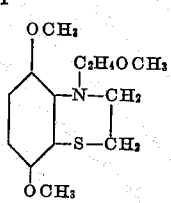

respectively, for 23.5 grams of

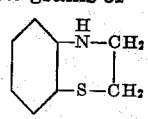

in the above example, other dye compounds within the scope of our invention can be prepared.

Similarly, 17.3 grams of 1-amino-2-chloro-4-nitrobenzene, 21.7 grams of 1-amino-2-bromo-4-nitrobenzene, 16.8 grams of 1-amino-2-methoxy-4-nitrobenzene and 18 grams of 4-amino-3-nitrophenylmethylketone can be diazotized and each of the diazonium compounds resulting can be coupled with each of the coupling components above described to obtain dye compounds of our invention.

*Example 2*

29.5 grams of

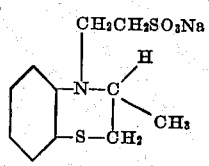

are dissolved in water. The resulting solution is cooled to a temperature approximating 0–10° C. and the diazonium compound resulting from the diazotization of 12.8 grams of o-chloroaniline are added with stirring. Following the addition of the diazotized o-chloroaniline, the mixture is slowly made neutral to litmus by the addition of sodium carbonate. Upon completion of the coupling reaction which takes place, the dye compound formed is precipitated out by the addition of sodium chloride, recovered by filtration, and dried.

31.1 grams of

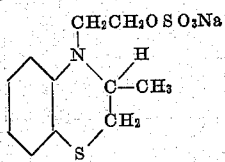

may be substituted for the coupling component of the above example to obtain a dye compound of our invention. Similarly, 13.5 grams of p-aminoacetophenone may be diazotized and the diazonium compound resulting can be coupled with each of the coupling components just mentioned to obtain dye compounds of our invention.

*Example 3*

18.3 grams of 1-amino-2,4-dinitrobenzene are diazotized in known fashion and the diazonium compound resulting is coupled with 20.1 grams of

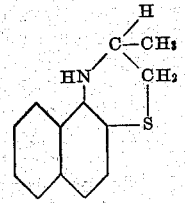

Coupling and recovery of the dye compound formed may be carried out in accordance with the method described in Example 1. The dye compound thus obtained colors cellulose acetate silk a purple shade.

21.5 grams of

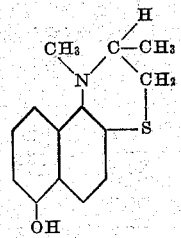

24.5 grams of

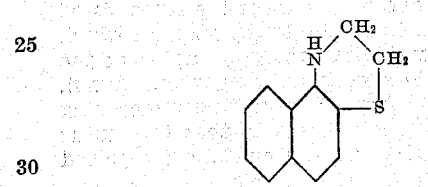

and 27.5 grams of

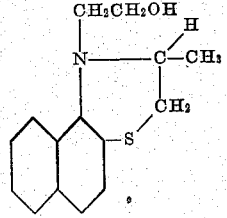

can be substituted for the coupling component of the example to obtain dye compounds of our invention. Similarly, 21.8 grams of 1-amino-2,4-dinitro-6-chlorobenzene and 26.2 grams of 1-amino-2,4-dinitro-6-bromobenzene can be diazotized and the diazonium compounds obtained coupled with each of the coupling components mentioned in this example to obtain dye compounds of our invention.

*Example 4*

1 gram mole of

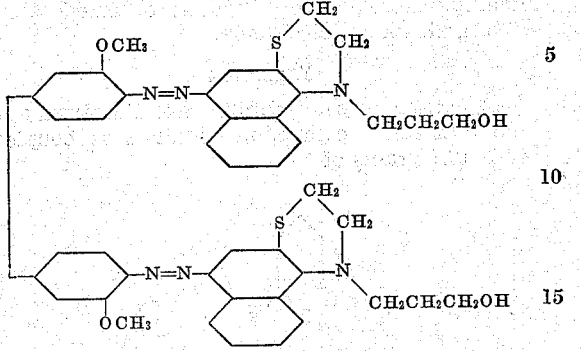

is dissolved in dry pyridine and treated with 1 gram mole of

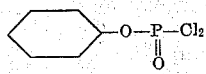

The reaction is completed by warming. Following completion of the reaction, aqueous sodium carbonate is added and the reaction product is worked up in known fashion. The dye compound obtained has the formula:

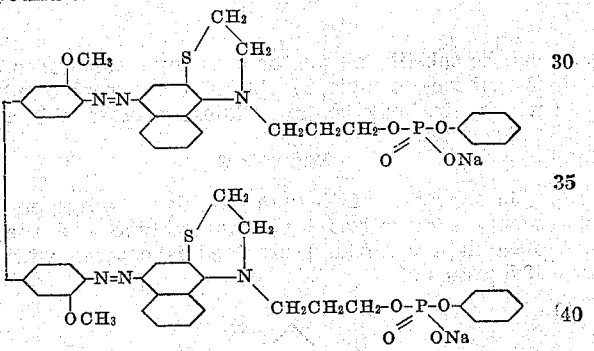

and colors cellulose acetate silk, wool and silk a red shade.

*Example 5*

20.7 grams of p-aminoazobenzene are diazotized and the diazonium compound obtained is coupled with 34.7 grams of

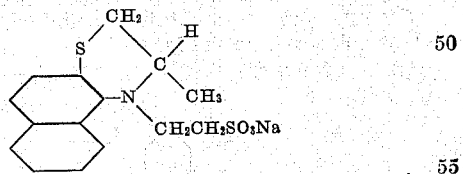

The diazotization reaction may be carried out as described in Example 1 while the coupling reaction and recovery of the dye compound formed may be carried out as described in Example 2. The dye compound obtained colors cellulose acetate silk, wool and silk a rubine shade.

*Example 6*

18.6 grams of 5-nitro-2-aminobenzenesulfonic acid are diazotized in known fashion and the diazonium compound obtained is coupled with 36 grams of

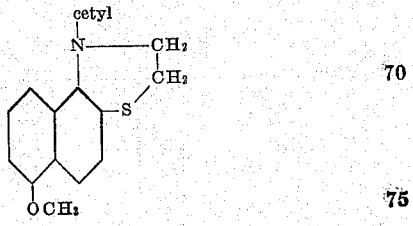

The coupling reaction may be carried out in accordance with the general method described in Example 1. The dye compound obtained colors wool and silk a violet shade.

*Example 7*

13.8 grams of p-nitroaniline are diazotized and the diazonium compound obtained is coupled with 16.7 grams of

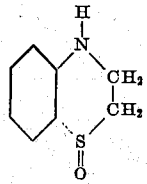

The diazotization, coupling and recovery of the dye compound formed may be carried out as described in Example 1. The dye compound obtained colors cellulose acetate silk a red shade.
18.3 grams of

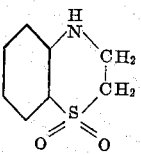

can be substituted for the coupling compound of the above example to obtain a dye compound which similarly colors cellulose acetate silk a red shade.

*Example 8*

17.3 grams of 1-amino-2-chloro-4-nitrobenzene are diazotized in known fashion and the diazonium compound obtained is coupled with 19.5 grams of

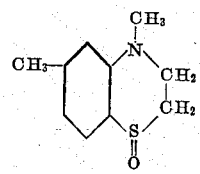

Coupling and recovery of the dye compound may be carried out as described in Example 1. The dye compound obtained colors cellulose acetate silk a rubine shade.
21.1 grams of

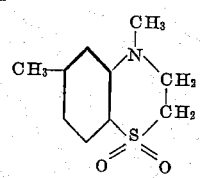

can be substituted for the coupling component of the above example to obtain a dye compound which similarly colors cellulose acetate silk a rubine shade.

Coupling components identical with those disclosed in Examples 1, 2, 3, 5 and 6, except that the sulfur atom in the ring joined to the benzene or naphthalene nucleus is replaced by a —S=O group or a

group, can be coupled with the diazo components shown in these examples to obtain dye compounds of analogous structure which possess generally similar dyeing properties as the corresponding dyes of said examples. Similarly, coupling components identical with those disclosed in the tabulation hereinafter, except for the difference above noted, can be coupled with the diazonium derivatives of the amines listed in the tabulation to obtain dye compounds which possess generally similar dyeing properties as the corresponding dyes of said tabulation. Again, an azo compound identical with that undergoing treatment in Example 4, except that the sulfur atoms joined to the naphthyl nuclei are replaced by —S=O or

groups, can be similarly treated to obtain dye compounds of analogous structure and dyeing properties. It will be understood of course that any of the diazo components disclosed herein may be coupled with any of the coupling components disclosed herein to obtain dye compounds included within the scope of our invention. The specific dye compounds disclosed herein are intended to be illustrative and not limitative of the invention.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 8, inclusive.

| Amine | Coupling component | | Color on cellulose acetate silk |
|---|---|---|---|
| o,m,p-Haloaniline | (1) | 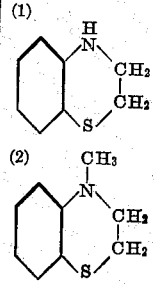 | Yellow. |
| Do | (2) | 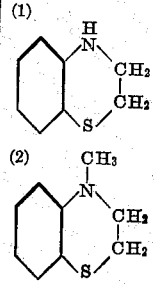 | Do. |

| Amine | Coupling component | Color on cellulose acetate silk |
|---|---|---|
| o,m,p-Haloaniline | (3) benzothiazine with N-CH(CH$_3$)-CH$_2$- bridge and p-methoxybenzyl on N; OCH$_3$ substituent | Yellow. |
| Do | (4) benzothiazine (CH$_3$O-substituted) with N-CH(C$_2$H$_5$)-CH$_2$-, N-CH$_2$CH$_2$OH | Do. |
| Do | (5) benzothiazine with N-CH(CH$_3$)-CH$_2$-, N-CH$_2$CH$_2$OCH$_3$ | Do. |
| Do | (6) benzothiazine with N-CH$_2$-CH$_2$-, N-C$_2$H$_4$OC$_2$H$_4$OH | Do. |
| Do | (7) CH$_3$O- and CH$_3$-substituted benzothiazine, N-CH(CH$_3$)-CH$_2$-, N-CH$_2$CHOHCH$_3$ | Do. |
| Do | (8) benzothiazine with N-CH$_2$-CH$_2$-, N-CH$_2$CH$_2$CH$_2$OH | Do. |
| Do | (9) di-CH$_3$O-substituted benzothiazine, N-CH(CH$_3$)-CH$_2$-, N-CH$_2$CHOHCH$_2$OH | Do. |
| Do | (10) CH$_3$-substituted benzothiazine, N-CH(CH$_3$)-CH$_2$-, N-CH$_2$CHOHCH$_2$OCH$_3$ | Do. |
| 1-amino-2,4-dihalobenzene | Coupling components 1–10 | Orange. |
| p-Aminoacetophenone | do | Do. |
| o-Nitroaniline | do | Do. |
| m-Nitroaniline | do | Yellow. |
| p-Nitroaniline | do | Red. |
| 1-amino-2-methyl-4-nitrobenzene | do | Do. |
| 1-amino-2-methoxy-4-nitrobenzene | do | Do. |
| 1-amino-2-halogen-4-nitrobenzene | do | Rubine. |
| 3-nitro-4-amino-phenylmethylketone | do | Do. |
| 1-amino-2-nitro-4-halobenzene | do | Orange-red. |
| 1-amino-2-nitro-4-methylbenzene | do | Do. |
| 1-amino-2-nitro-4-methoxybenzene | do | Do. |
| 1-amino-3-nitro-6-chlorobenzene | do | Orange. |
| 1-amino-3-nitro-6-ethylbenzene | do | Do. |
| 1-amino-3-nitro-6-ethoxybenzene | do | Do. |
| 1-amino-2-nitro-5-chlorobenzene | do | Do. |
| 1-amino-2-nitro-5-propylbenzene | do | Do. |
| 1-amino-2-nitro-5-methoxybenzene | do | Do. |
| 5-nitro-2-amino-phenylmethylsulfone | do | Rubine. |
| 2-amino-6-methoxybenzothiazole | do | Do. |
| 1-amino-2,4-dinitrobenzene | do | Wine. |

| Amine | Coupling component | Color on cellulose acetate silk |
|---|---|---|
| 1-amino-2,4-dinitro-6-halobenzene | Coupling components 1–10 | Violet to reddish-blue. |
| 1-amino-2,4-dinitronaphthalene | do | Do. |
| 1-amino-2,4,6-trinitrobenzene | do | Reddish-blue to blue. |
| 1-amino-2,4-dinitrobenzene | (11) 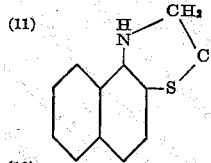 | Purple. |
| Do | (12) 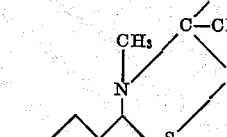 | Do. |
| Do | (13)  | Violet. |
| Do | (14) 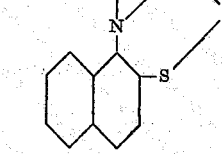 | Greenish-blue. |
| Do | (15) 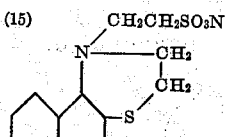 | Blue. |
| Do | (16) 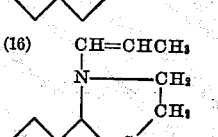 | Do. |
| 1-amino-2,4-dinitro-6-halobenzene | Coupling components 11–16 | Purple to greenish-blue. |
| 1-amino-2-nitro-4-chlorobenzene | (17) 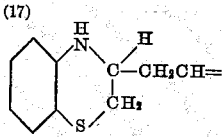 | Violet. |
| Do | (18) cyclohexyl 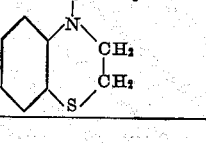 | Do. |

Diazotized 5-nitro-2-aminobenzenesulfonic acid may be coupled with each of the coupling components numbered 1 to 10 above to obtain dyes which yield red shades on wool and silk. This same diazonium compound may be coupled with each of the coupling components numbered 11 to 18 to obtain dye compounds which are suitable for the coloration of wool and silk and which yield various shades thereon.

In order that the preparation of the azo compounds of our invention may be clearly understood the preparation of a number of intermediate compounds employed in their manufacture is given hereinafter.

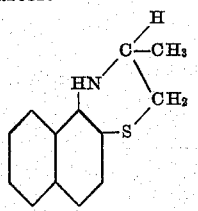

for example, can be prepared by reducing

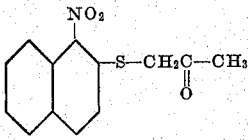

in accordance with the general procedure described in Berichte der Deutschen Chemischen Gesellschaft, vol. 31, pages 752–758 (1897). The desired compound can be purified by distillation under reduced pressure. In a similar manner,

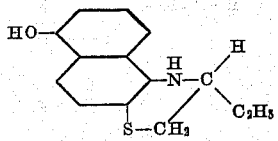

can be prepared by reducing

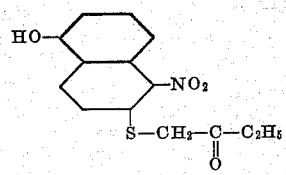

Similarly,

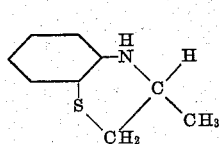

can be prepared by reducing

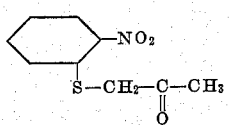

Thus, compounds having the general formulae:

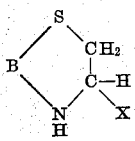

and

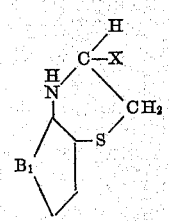

wherein B, $B_1$ and X have the meaning previously assigned to them can be prepared by reducing compounds having the general formulae:

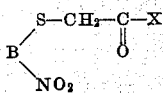

and

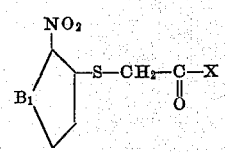

wherein B, $B_1$ and X have the meaning previously assigned to them. These latter compounds can be prepared after the general method set forth in Liebig's Annalen, vol. 391, pages 84–88 (1912).

Compounds having the general formulae:

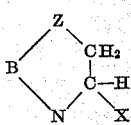

and

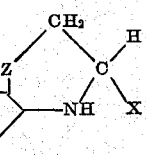

wherein B, $B_1$ and X have the meaning previously assigned to them and Z is a —S=O or

group can be prepared by oxidizing the ketone intermediate compounds just described to their sulfone and sulfoxide forms and reducing the ketone derivatives obtained in the manner previously described or by oxidation of the corresponding heterocyclic coupling components wherein Z is a sulfur atom. Suitable oxidizing agents which may be employed include nitric acid, sodium dichromate, potassium permanganate and sodium hypochlorite.

Substituents on the nitrogen atom of the coupling components of our invention can be introduced by known methods for the introduction of the substituent. Alkyl groups can be introduced by reaction with alkylene oxides such as ethylene oxide and propylene oxide, alkylene chlorohydrins such as ethylene chlorohydrin and propylene chlorohydrin and with alkyl halides such as methyl chloride, ethyl bromide and propyl chloride. Similarly, aryl groups can be introduced by arylation in known fashion.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water-soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo dye compounds selected from the group consisting of azo compounds having the general formulae:

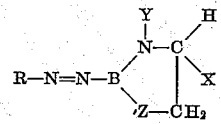

and

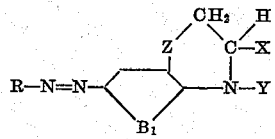

wherein R represents the residue of an aromatic nucleus, Z represents a member selected from the group consisting of a sulfur atom, a —S=O group and a

group, B represents the residue of an aryl nucleus of the benzene series containing but one benzene nucleus and wherein the nitrogen atom shown and Z are attached to said aryl nucleus B in para and meta position, respectively, to the azo bond, $B_1$ represents the residue of an aryl nucleus of the benzene series containing but one benzene nucleus joined to the nucleus shown through adjacent carbon atoms, X represents a member selected from the group consisting of hydrogen, an alkyl group, an allyl group, and a cycloalkyl group and Y represents a member selected from the group consisting of hydrogen, an alkyl group, an allyl group, an aryl nucleus of the benzene series and a cycloalkyl group.

2. The azo dye compounds selected from the group consisting of azo compounds having the general formulae:

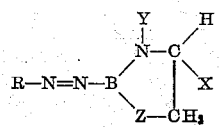

and

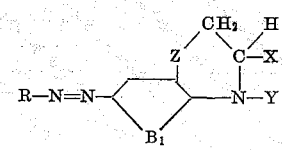

wherein R represents the residue of an aryl nucleus of the benzene series, Z represents a members selected from the group consisting of a sulfur atom, a —S=O group and a

group, B represents the residue of an aryl nucleus of the benzene series containing but one benzene nucleus and wherein the nitrogen atom and the sulfur atom shown are attached to said aryl nucleus B in para and meta position, respectively, to the azo bond, $B_1$ represents the residue of an aryl nucleus of the benzene series containing but one benzene nucleus joined to the nucleus shown through adjacent carbon atoms, X represents a member selected from the group consisting of hydrogen, an alkyl group, an allyl group, and a cycloalkyl group and Y represents a member selected from the group consisting of hydrogen, an alkyl group, an allyl group, an aryl nucleus of the benzene series and a cycloalkyl group.

3. The azo dye compounds selected from the group consisting of azo compounds having the general formulae:

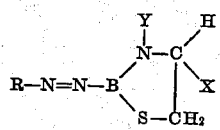

and

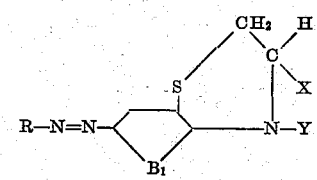

wherein R represents the residue of an aryl nucleus of the benzene series, B represents the residue of an aryl nucleus of the benzene series containing but one benzene nucleus and wherein the nitrogen atom and the sulfur atom shown are attached to said aryl nucleus B in para and meta position respectively to the azo bond, $B_1$ represents the residue of an aryl nucleus of the benzene series containing but one benzene nucleus joined to the nucleus shown through adjacent carbon atoms, X represents a member selected from the group consisting of hydrogen, an alkyl group, an allyl group, and a cycloalkyl group and Y represents a member selected from the group consisting of hydrogen, an alkyl group, an allyl group, an aryl nucleus of the benzene series and a cycloalkyl group.

4. The azo dye compounds selected from the group consisting of azo compounds having the general formulae:

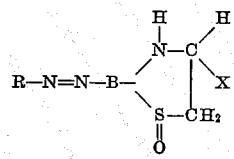

and

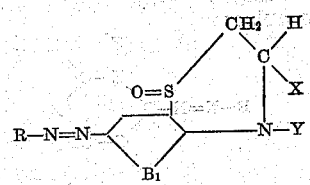

wherein R represents the residue of an aryl nucleus of the benzene series, B represents the residue of an aryl nucleus of the benzene series containing but one benzene nucleus and wherein the nitrogen atom and the sulfur atom shown are attached to said aryl nucleus B in para and meta position respectively to the azo bond, $B_1$ represents the residue of an aryl nucleus of the benzene series containing but one benzene nucleus joined to the nucleus shown through adjacent carbon atoms, X represents a member selected from the group consisting of hydrogen, an alkyl group, an allyl group, and a cycloalkyl group and Y represents a member selected from the group consisting of hydrogen, an alkyl group, an allyl group, an aryl nucleus of the benzene series and a cycloalkyl group.

5. The azo dye compounds selected from the group consisting of azo compounds having the general formulae:

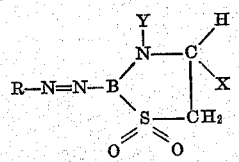

and

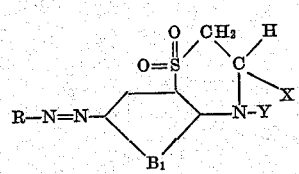

wherein R represents the residue of an aryl nucleus of the benzene series, B represents the residue of an aryl nucleus of the benzene series containing but one benzene nucleus and wherein the nitrogen atom and the sulfur atom shown are attached to said aryl nucleus B in para and meta position respectively to the azo bond, $B_1$ represents the residue of an aryl nucleus of the benzene series containing but one benzene nucleus joined to the nucleus shown through adjacent carbon atoms, X represents a member selected from the group consisting of hydrogen, an alkyl group, an allyl group, and a cycloalkyl group and Y represents a member selected from the group consisting of hydrogen, an alkyl group, an allyl group, an aryl nucleus of the benzene series and a cycloalkyl group.

6. The azo dye compounds selected from the group consisting of azo compounds having the general formulae:

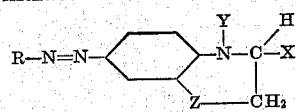

and

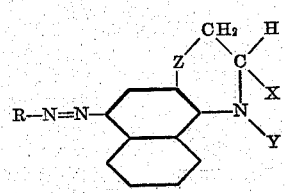

wherein R represents the residue of an aryl nucleus of the benzene series, Z represents a member selected from the group consisting of a sulfur atom, a —S=O group and a

group, X represents a member selected from the group consisting of hydrogen, an alkyl group, an allyl group, and a cycloalkyl group and Y represents a member selected from the group consisting of hydrogen, an alkyl group, an allyl group, an aryl nucleus of the benzene series and a cycloalkyl group.

7. The azo dye compounds having the general formula:

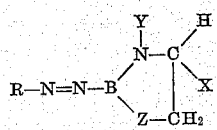

wherein R represents the residue of an aryl nucleus of the benzene series, Z represents a member selected from the group consisting of a sulfur atom, a —S=O group and a

group, B represents the residue of an aryl nucleus of the benzene series containing but one benzene nucleus and wherein the nitrogen atom shown and Z are attached to said aryl nucleus B in para and meta position respectively to the azo bond, X represents a member selected from the group consisting of hydrogen, an alkyl group, an allyl group, and a cycloalkyl group and Y represents a member selected from the group consisting of hydrogen, an alkyl group, an allyl group, an aryl nucleus of the benzene series and a cycloalkyl group.

8. The azo dye compounds having the general formula:

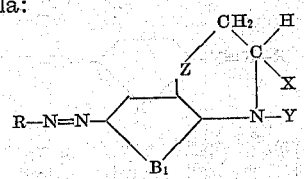

wherein R represents the residue of an aryl nucleus of the benzene series, Z represents a member selected from the group consisting of a sulfur atom, a —S=O group and a

group, $B_1$ represents the residue of an aryl nucleus of the benzene series containing but one benzene nucleus joined to the nucleus shown through adjacent carbon atoms, X represents a member selected from the group consisting of hydrogen, an alkyl group, an allyl group and a cycloalkyl group and Y represents a member selected from the group consisting of hydrogen, an alkyl group, an allyl group, an aryl nucleus of the benzene series and a cycloalkyl group.

9. The azo dye compounds selected from the group consisting of azo compounds having the general formulae:

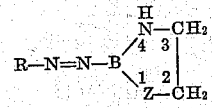

and

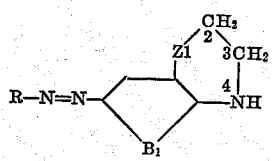

wherein R represents the residue of an aryl nucleus of the benzene series, Z represents a member selected from the group consisting of a sulfur atom, a —S=O group and a

group, B represents the residue of an aryl nucleus of the benzene series containing but one benzene nucleus and wherein the nitrogen atom shown and Z are attached to said aryl nucleus B in para and meta position, respectively, to the azo bond, $B_1$ represents the residue of an aryl nucleus of the benzene series containing but one benzene nucleus joined to the nucleus shown through adjacent carbon atoms and wherein a hydrogen atom attached to the carbon atom numbered 3 and the hydrogen atom attached to the nitrogen atom numbered 4 can each be replaced by an alkyl group.

10. Material made of or containing an organic derivative of cellulose colored with a nuclear non-sulfonated azo dye compound selected from the group consisting of azo compounds having the general formulae:

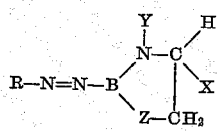

and

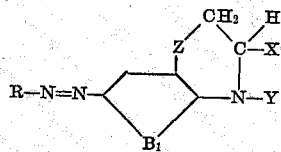

wherein R represents the residue of an aromatic nucleus, Z represents a member selected from the group consisting of a sulfur atom, a —S=O group and a

group, B represents the residue of an aryl nucleus of the benzene series containing but one benzene nucleus and wherein the nitrogen atom shown and Z are attached to said aryl nucleus B in para and meta position, respectively, to the azo bond, $B_1$ represents the residue of an aryl nucleus of the benzene series containing but one benzene nucleus joined to the nucleus shown through adjacent carbon atoms, X represents a member selected from the group consisting of hydrogen, an alkyl group, an allyl group, and a cycloalkyl group and Y represents a member selected from the group consisting of hydrogen, an alkyl group, an allyl group, an aryl nucleus of the benzene series and a cycloalkyl group.

11. Material made of or containing an organic derivative of cellulose colored with a nuclear non-sulfonated azo dye compound selected from the group consisting of azo compounds having the general formulae:

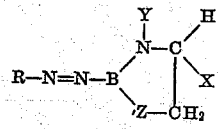

and

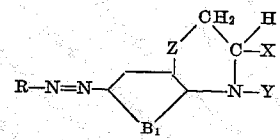

wherein R represents the residue of an aryl nucleus of the benzene series, Z represents a member selected from the group consisting of a sulfur atom, a —S=O group and a

group, B represents the residue of an aryl nucleus of the benzene series containing but one benzene nucleus and wherein the nitrogen atom shown and Z are attached to said aryl nucleus B in para and meta position, respectively, to the azo bond, $B_1$ represents the residue of an aryl nucleus of the benzene series containing but one benzene nucleus joined to the nucleus shown through adjacent carbon atoms, X represents a member selected from the group consisting of hydrogen, an alkyl group, an allyl group, and a cycloalkyl group and Y represents a member selected from the group consisting of hydrogen, an alkyl group, an allyl group, an aryl nucleus of the benzene series and a cycloalkyl group.

12. A cellulose acetate colored with a nuclear non-sulfonated azo dye compound selected from the group consisting of azo compounds having the general formulae:

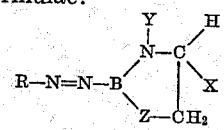

and

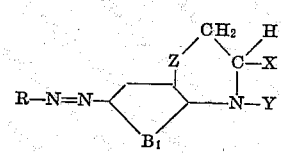

wherein R represents the residue of an aryl nucleus of the benzene series, Z represents a member selected from the group consisting of a sulfur atom, a —S=O group and a

group, B represents the residue of an aryl nucleus of the benzene series containing but one benzene nucleus and wherein the nitrogen atom shown and Z are attached to said aryl nucleus B in para and meta position, respectively to the azo bond, $B_1$ represents the residue of an aryl nucleus of the benzene series containing but one benzene nucleus joined to the nucleus shown through adjacent carbon atoms, X represents a member selected from the group consisting of hydrogen, an alkyl group, an allyl group, and a cycloalkyl group and Y represents a member selected from the group consisting of hydrogen, an alkyl group, an allyl group, an aryl nucleus of the benzene series and a cycloalkyl group.

13. A cellulose acetate colored with a nuclear non-sulfonated azo dye compound selected from the group consisting of azo compounds having the general formulae:

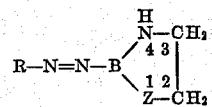

and

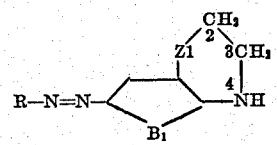

wherein R represents the residue of an aryl nucleus of the benzene series, Z represents a member selected from the group consisting of a sulfur atom, a —S=O group and a

group, B represents the residue of an aryl nucleus of the benzene series containing but one benzene nucleus and wherein the nitrogen atom shown and Z are attached to said aryl nucleus B in para and meta position, respectively, to the azo bond, $B_1$ represents the residue of an aryl nucleus of the benzene series containing but one benzene nucleus joined to the nucleus shown through adjacent carbon atoms and wherein a hydrogen atom attached to the carbon atom numbered 3 and the hydrogen atom attached to the nitrogen atom numbered 4 can each be replaced by an alkyl group.

JAMES G. McNALLY.
JOSEPH B. DICKEY.